United States Patent [19]
Jung

[11] Patent Number: 5,683,477
[45] Date of Patent: Nov. 4, 1997

[54] DUST COLLECTOR USING PURSE-TYPE FILTER CLOTH

[75] Inventor: Bong Gyu Jung, Seoul, Rep. of Korea

[73] Assignee: Gong Young Engineering Co., Ltd., Kyungki-do, Rep. of Korea

[21] Appl. No.: 579,685

[22] Filed: Dec. 28, 1995

[30] Foreign Application Priority Data

Jul. 14, 1995 [KR] Rep. of Korea .......... 95-20837

[51] Int. Cl.⁶ .......... B01D 29/52
[52] U.S. Cl. .......... 55/350.1; 55/482; 55/492; 55/508
[58] Field of Search .......... 55/302, 304, 315, 55/380, 432, DIG. 5, DIG. 12

[56] References Cited

U.S. PATENT DOCUMENTS

| | | | |
|---|---|---|---|
| 4,193,780 | 3/1980 | Cotton, Jr. et al. | 55/380 |
| 4,445,913 | 5/1984 | Nishiyama | 55/302 |
| 4,655,806 | 4/1987 | Bowersox | 55/432 |

*Primary Examiner*—Jay H. Woo
*Assistant Examiner*—Minh-Chau T. Pham
*Attorney, Agent, or Firm*—Jacobson, Price, Holman & Stern, PLLC

[57] ABSTRACT

A dust collector using a purse-type filter cloth is disclosed including a housing on whose top an intake for inducing a mixed current containing natural or chemically produced solid fine material is provided; a hexahedral purse-type filter cloth installed in zigzag inside the housing to form a filtering/dust collecting area and for filtering the solid fine material and purging only purity air; and a purging portion for exhausting purity air cleaned by the purse-type filter cloth through the housing.

4 Claims, 11 Drawing Sheets

FIG. IA
prior art
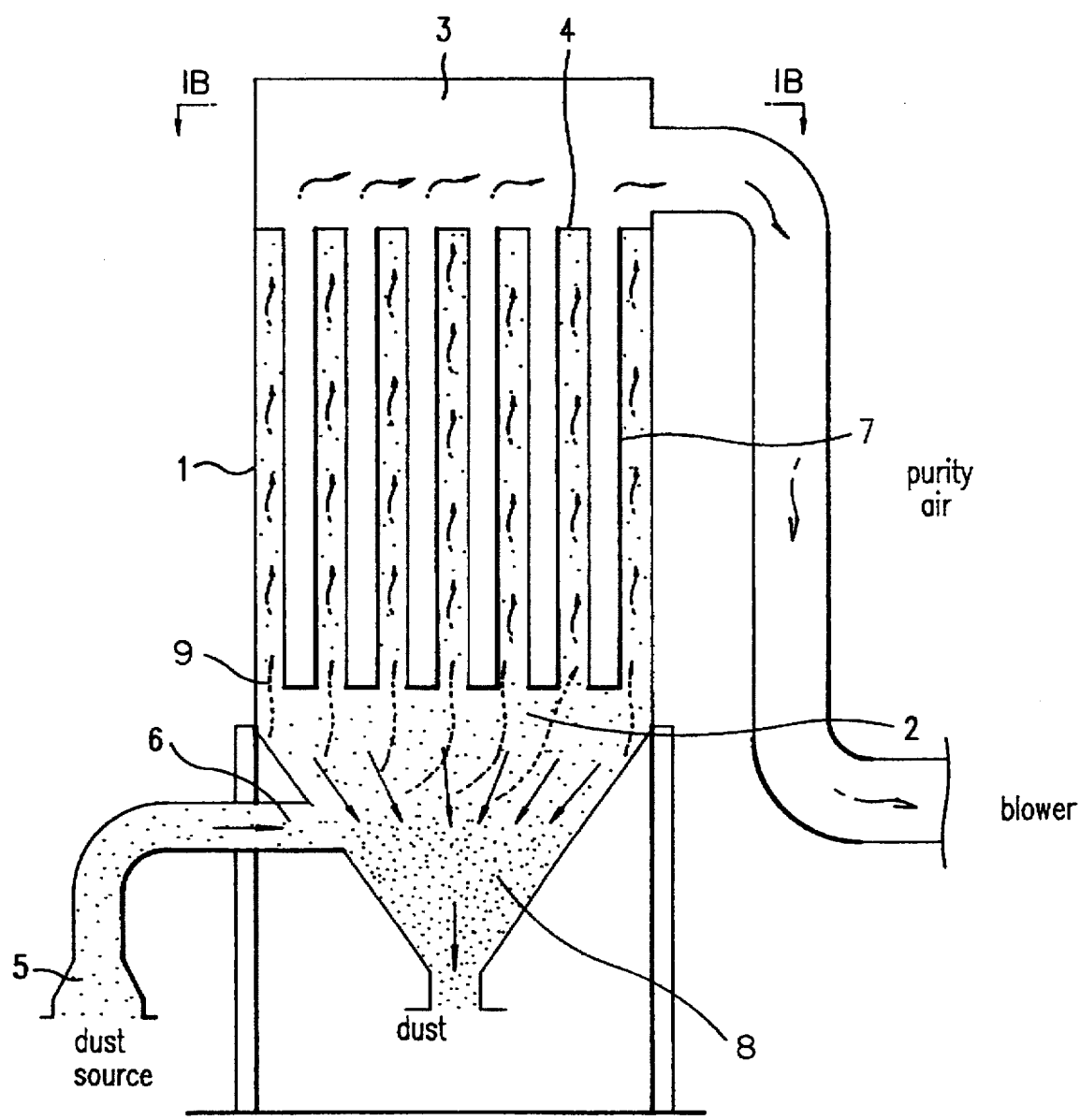

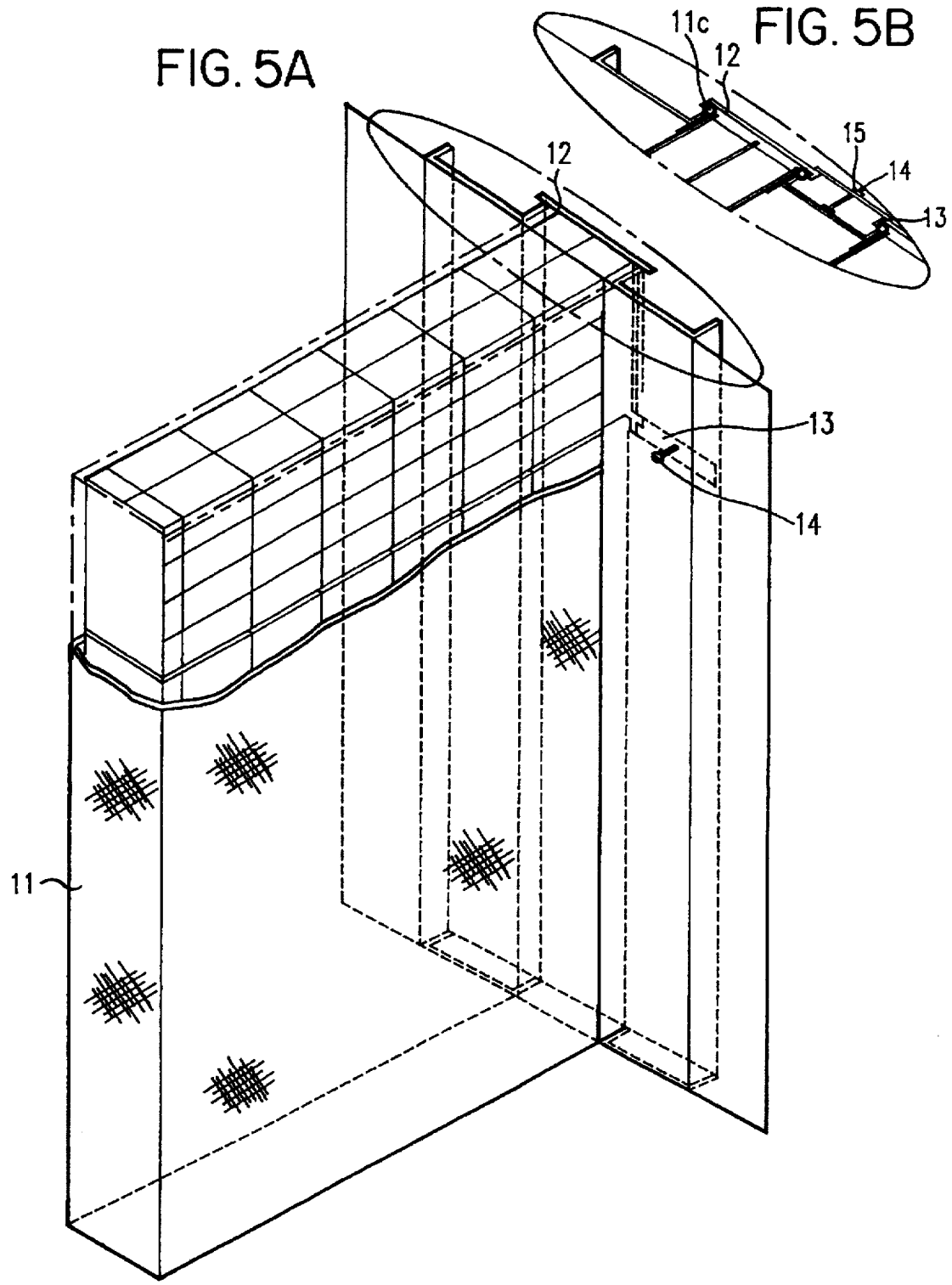

DUST COLLECTOR USING PURSE-TYPE FILTER CLOTH

BACKGROUND OF THE INVENTION

The present invention relates to a dust collector which chooses, in a variety of industrial fields, a purse-type filter fibrosis as its filter cloth, the most important element in preventing fine dust from being flied or scattered, and more particularly, to a dust collector in which the purging speed of purity air filtered by the filter cloth maintains a constant speed without being interrupted by the vertical length of the filter cloth in collecting chemical soot such as fume and mist, smut, or coal dust as well as withdrawing fine dust.

Generally, among filters made of natural, chemical or metal fiber and mounted on the dust collector, there are bag type and envelope type. For arrangement of the filter cloth, there are planar, vertical and intermittence methods.

According to these methods, it is very hard to maintain a uniform pressure at the filtering/dust collecting area and maintain an average filtering velocity at the purity air purging area. In addition, they are unfavorable in performance, which will be discussed below.

In a conventional dust collector, mixed current (gas+solid) enters the lower portion of a filter cloth and is then lifted upward to remove dust. Filtered purity air goes out of the dust collector through its top. For this reason, the flow of withdrawn or collected dust and the flow of fine dust of chemical solid encounter fiercely when they are intersected upward and downward.

As shown in FIG. 1A, in the conventional dust collector, a filter cloth mounting plate 4 for dividing a cylindrical or rectangular housing 1 into filtering/dust collecting area 2 and purity air purging area 3 is fixed to the upper portion of the housing. On the filter cloth mounting plate, a plurality of bag-shaped filter cloth 7 for dividing the mixed current entering hopper intake 6 connected to hood 5 into dust and purity air are given. They droop vertically. A rotary valve (not shown) for collecting the divided dust is rotatably installed under the housing.

In this configuration, when a blower (not shown) rotates and thus the internal pressure of housing 1 decreases, sucking force is produced so that the mixed current from a dust source passes through hood 5 and enters housing 1 through its bottom.

When the mixed current containing dust enters housing 1 through hopper intake 6, the dust of the mixed current is filtered by bag-shaped filter cloth 7 in filtering/dust collecting area 2 so that only purity air is discharged to purity air purging area 3 above filter cloth mounting plate 4.

After repeated operations, when a large amount of dust is attached to filter cloth 7, excessive pressure loss takes place inside the housing to decrease dust efficiency. In order to prevent this, a dust removing device (not shown) for periodically removing dust from filter cloth 7 is installed above filter cloth mounting plate 4 so that air of high pressure of about 4–7 kg/cm$^2$ is supplied to filter cloth 7 periodically (3–6 minutes).

When dust is removed from filter cloth 7 according to the periodic operations of the dust removing device falls freely to the bottom of housing 1 as shown in downward arrow 8, part of the freely falling dust intersects the mixed current coming in upward arrow 9 due to the continuous rotation of the blower so that the freely falling fine dust removed from the filter cloth is rescattered.

Therefore, the dust removed from filter cloth 7 is not collected in the bottom of housing 1 but raised upward to be attached back to filter cloth 7. This deteriorates the filtering function of the filter cloth, increasing the density of dust in the housing.

As a result, the internal pressure loss of the dust collector is accelerated to decrease the duration of filter cloth 7 and apply overload to the blower. The overload to the blower damages its motor, the driving source of the blower.

SUMMARY OF THE INVENTION

Therefore, it is an object of the present invention to provide a dust collector using a purse-type filter cloth in which a technical means for separating solid material contained in a mixed current having dry solid is devised to elongate the duration of the filter cloth and prevent a blower's motor from being damaged due to pressure loss.

To accomplish the object of the present invention, there is provided a dust collector using a purse-type filter cloth including a housing on whose top an intake for inducing a mixed current containing natural or chemically produced solid fine material is provided; a hexahedral purse-type filter cloth installed in zigzag inside the housing to form a filtering/dust collecting area and for filtering the solid fine material and purging only purity air; and a purging portion for exhausting purity air cleaned by the purse-type filter cloth through the housing.

BRIEF DESCRIPTION OF THE ATTACHED DRAWINGS

FIG. 1A is a schematic view of a dust collector having a conventional bag-shaped filter cloth;

FIG. 5 is a partially cutaway perspective view of the installation of the purse-type filter cloth;

DETAILED DESCRIPTION OF THE INVENTION

Hereinafter, a preferred embodiment of the present invention will be described in detail with reference to FIGS. 2–7.

A preferred embodiment of the present invention is constructed so that mixed current containing dust is sucked into the filtering/dust collecting area through the top of the housing to remove fine solid material such as dust, and then purity air is discharged from the bottom of the housing.

Figure 3B:
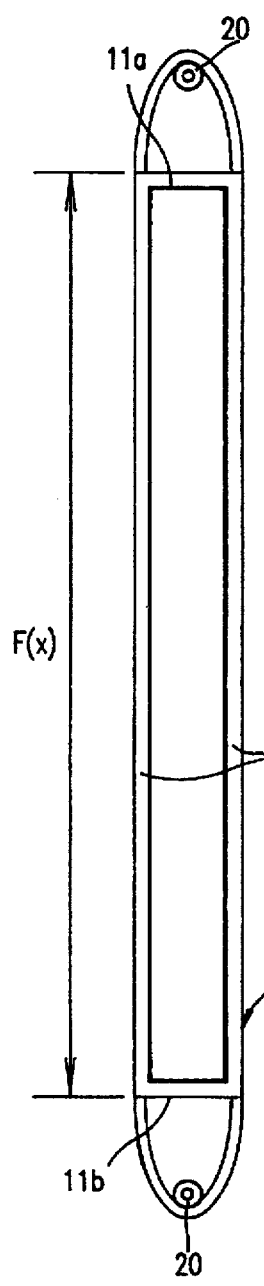
FIG. 3 is a perspective and side view of a state in which one purse-type filter cloth is installed in the present invention.
Figure 6:
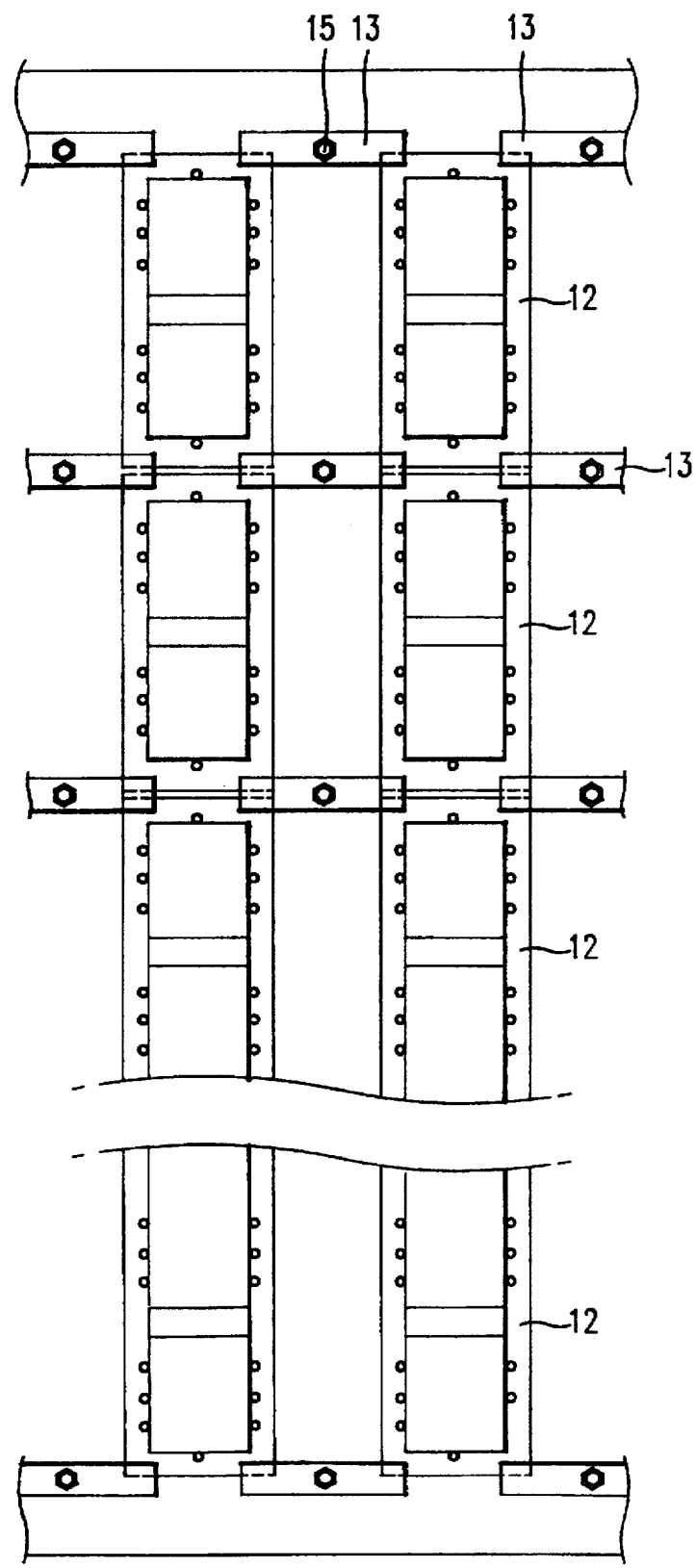
FIG. 6 is a front view from the purging area, of the installation of the purse-type filter cloth.

In purse-type filter cloth 11 shown in FIG. 3, an important component of the present invention, retainers 12 of metal are installed in stack according to the vertical length of the purse-type filter cloth, as shown in FIGS. 5 and 6.

According to this design, in order to increase the filtering area, the arrangement of the retainers is continuous not intermittent, and in turn the purging area of filtered clean air (purity air) increases in the respective units. Purse-type filter cloth 11 employed into the dust collector of the present invention are divided into various areas as shown in FIGS. 4A–4D so that the purging of purity air is optimally performed independent of the load pressure loss of the filtering area and the length of the filter cloth, greatly reducing current resistance.

In purse-type filter cloth 11, as shown in FIG. 5, the unit of retainer is established in such a manner that at least one, or multiple, if necessary, retainers 12 are stacked from the top 11a to the bottom 11b of filter cloth 11. In order to prevent filter cloth 11 from being deformed or distorted due to the mechanical operation of the dust collector, as shown in FIGS. 5 and 6, after a plurality of retainers 12 are stacked in filter cloth 11, a push plate 13 are put on a circular portion 11c formed on the mouth of the filter cloth, and then fastened by bolt 14 and nut 15.

Figure 7A:
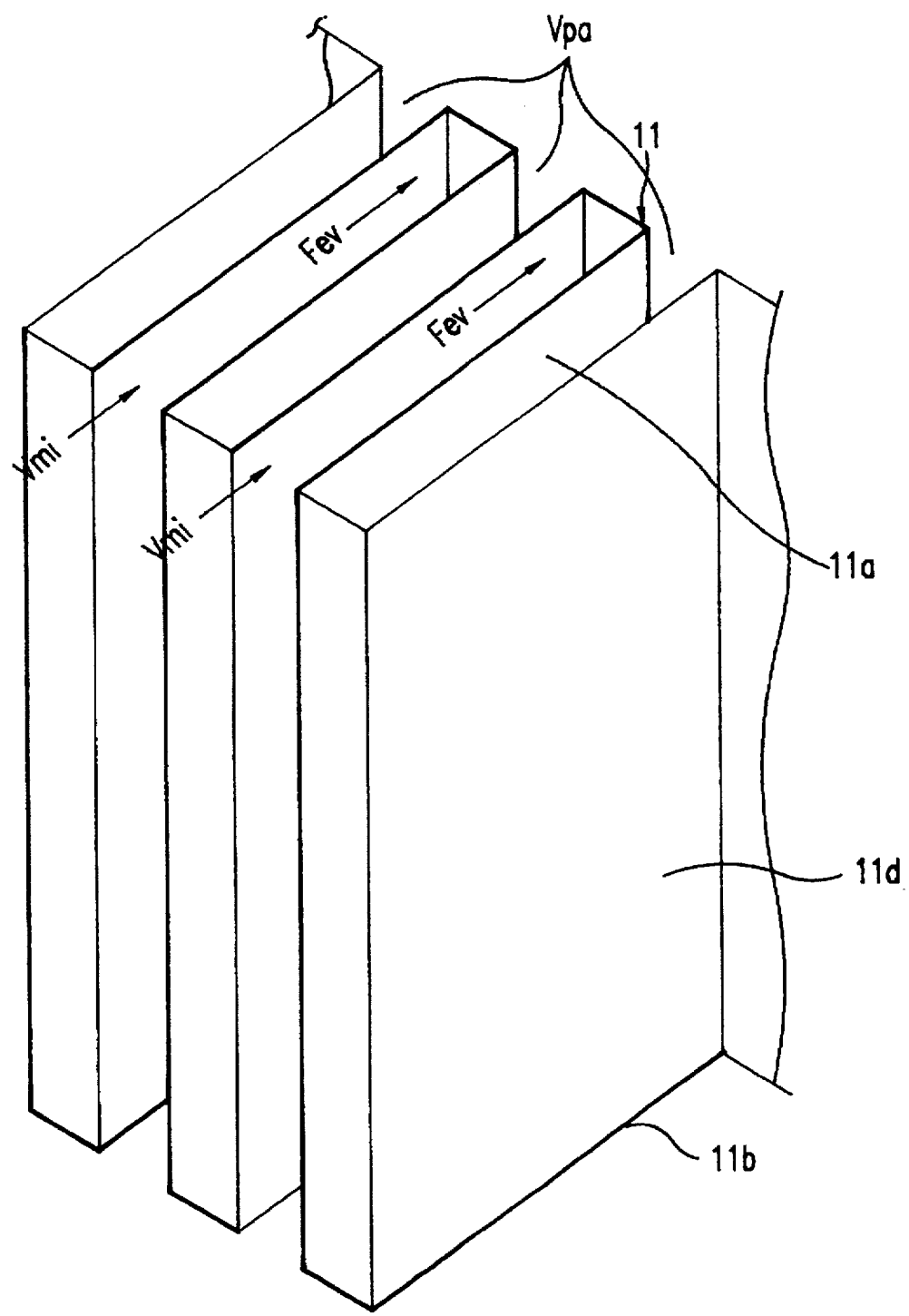
FIG. 7A is a schematic view of a state in which a multiple-folded purse-type filter cloth is installed.
Figure 7B:
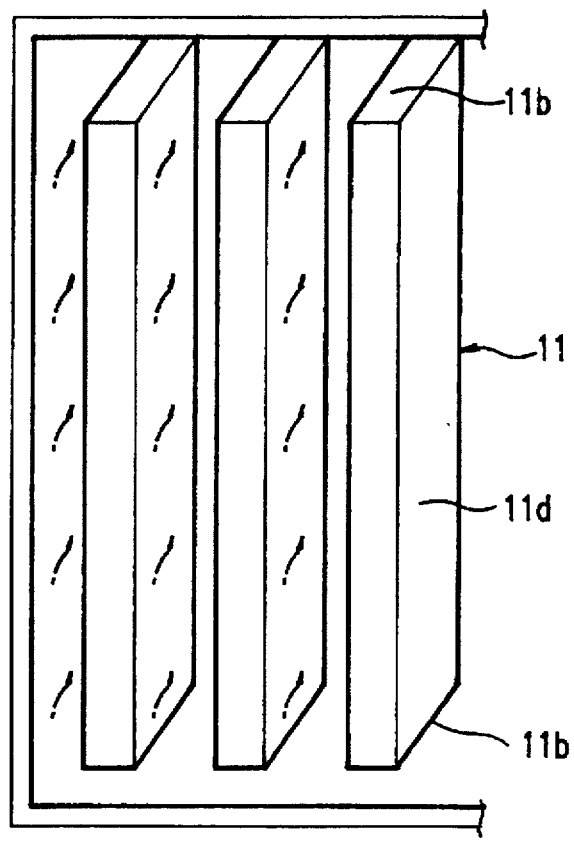
FIG. 7B illustrates the entry distribution of the mixed current (dust+air)
Figure 7C:
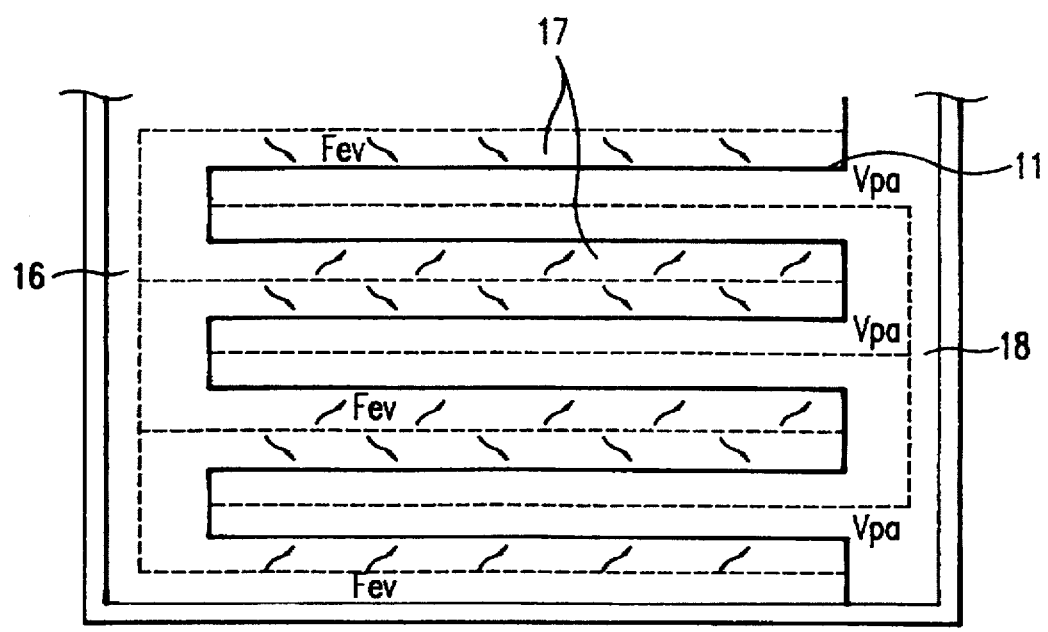
FIG. 7C illustrates the distribution of the filtering entry velocity and the position of the purging velocity of purity air.

Referring to FIGS. 7A, 7B and 7C, purse-type filter cloth 11 of the present invention is made in which purity air purging velocity Vpa, intermediate entry velocity Vmi, and filtering position entry velocity Fev are distributed uniformly. In other words, the purse-type filter cloth becomes the core of combining dust settling area 16, filtering/dust collecting area 17, purity air purging area 18, and dust discharging area 19.

Figure 1B:
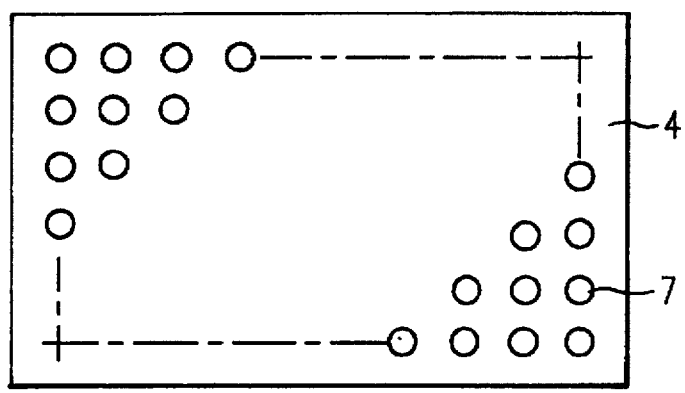
FIG. 1B is a sectional view of FIG. 1A taken along line A—A.
Figure 1C:
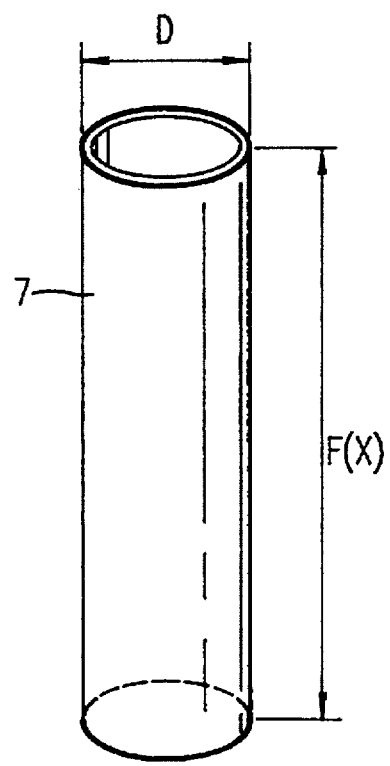
FIG. 1C is an elevational view of one bag-shaped filter cloth.

For the respective explanations to the various shapes of the filter cloth such as bag, envelope and purse, the bag-shaped filter cloth is cylindrical as shown in FIG. 1C. When this is fixed onto the filter cloth mounting plate, its filtering surfaces are trihedron (upper and lower surfaces and circumferential surface). In order to increase the filtering area, the circumferential surface must be increased in length (Fx) while diameter D is constant.

The envelope-shaped filter cloth is rectangular and dihedral. In this case, in order to increase its filtering area, the length of envelope must become longer, its width be changed, or the length and width of the envelope be increased simultaneously to thereby increase both sides thereof. This type of filter cloth is unfavorable to large or middle-sized dust collectors in structure.

The purse-shaped filter cloth of the present invention is hexahedral, whose top and bottom have similar areas in the original form.

In the present invention, two surfaces (upper and lower surfaces) of the hexahedron are set to be constant, and four sides of the twelve sides related to the remaining four surfaces are changed. As the filtering areas of two surfaces increase, the mouth area of the purse increases proportionally to optimally maintain the purging velocity of purity air. By doing so, the pressure loss of the dust collector is compensated to be favorable to the dust collecting function.

Though this may be seen as a simple principle, it will be found in the later description that optimal filtering function is exhibited by harmonizing six (front, rear, upper, lower, left and right) kinds of velocity of the filter cloth. Purse-type filter cloth 11 of the present invention assists many functions, and has significantly more advantages than well-known filter cloths.

According to these advantages, filter cloth 11 can be easily manufactured. In addition, compared with the conventional filter cloths whose filtering capacity is determined in design and thus extremely limited, the filter cloth of the present invention can exert the maximum of the filtering capacity according to the front, rear, left, right, upper and lower flow of mixed current from the center thereof.

Figure 2A:
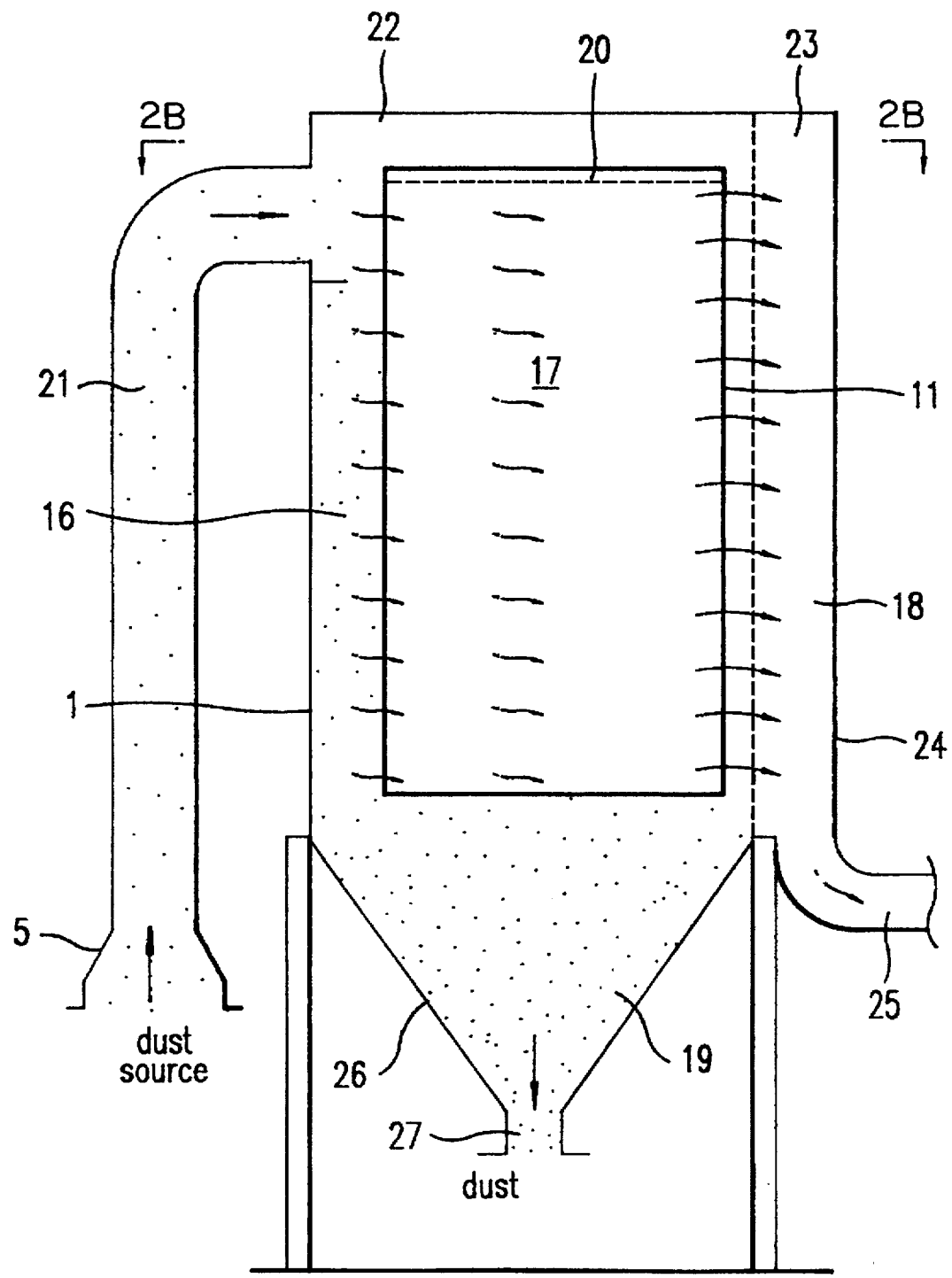
FIG. 2A is a schematic view of a dust collector using a purse-type filter cloth of the present invention.
Figure 2B:
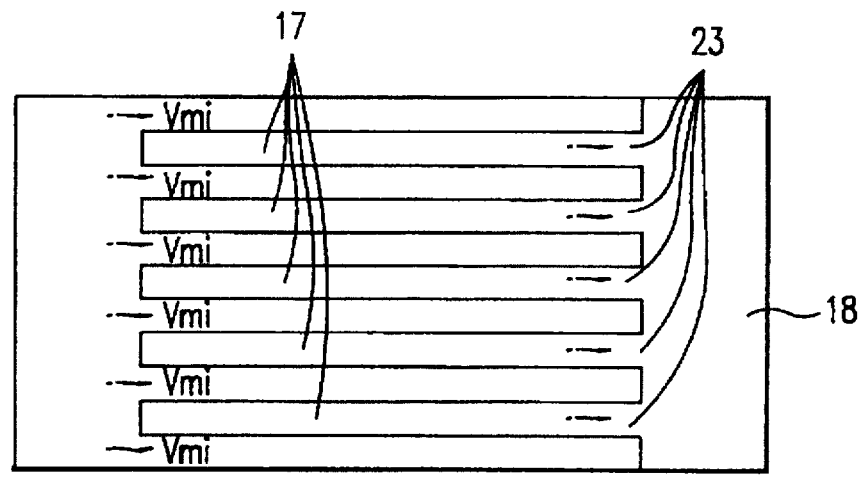
FIG. 2B is a sectional view of FIG. 2A taken along line B—B.

As shown in FIG. 2, the velocity of the current entering housing 1 through hood 5 from the dust source can be divided into a settling tank entry velocity at which mixed current (dust+air) goes into the housing having purse-type filter cloth 11, a dust settlement velocity inside the housing, an initial entry velocity at which the mixed current directed toward the area of purse-type filter cloth 11 changes its first direction and then enters the filter cloth, an entry velocity at which the mixed current enters the filtering area from the direction-changed initial entry velocity, a velocity, that is, entry velocity for filtering, at which the mixed current goes to a filtering position in the filtering area, a filtering velocity at which the mixed current passes through the filter cloth, and a purging velocity for purity air filtered.

Briefly, the velocities are mixed current settling tank entry velocity—dust settlement velocity inside the housing—initial entry velocity direction-changed to the filtering area—filtering area entry velocity from the initial entry velocity—filtering position entry velocity—filtering velocity—purity air purging velocity.

The flow of the mixed current according to the seven kinds of velocity indicates that load applied to the filter cloth can be reduced by fully using the natural settling velocity of the solid material (dust, fume, mist or smut).

Here, the settling velocity of material is based upon Stokes's law if the particle of dust is below 100μ, upon Allen's law if it is between 100–1,000μ, and upon Newton's law if it is above 1,000μ.

Figure 3A:
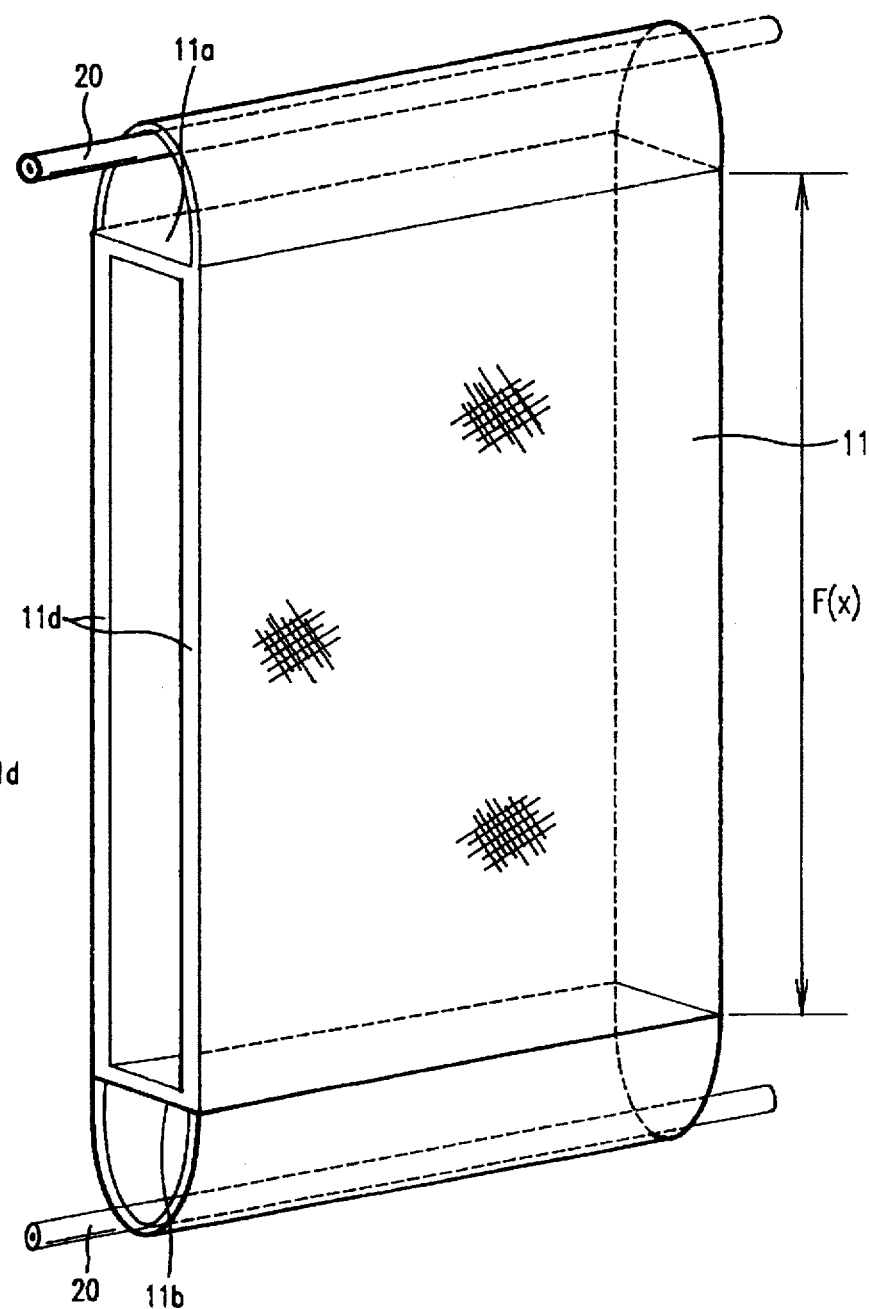

The configuration of purse-type filter cloth 11 will be described with reference to FIG. 3A.

The upper and lower surfaces 11a and 11b of the hexahedron of purse-type filter cloth 11 are constant in dimension or area even if the vertical length (F(x)) varies. With the constant upper and lower surfaces 11a and 11b, it is then possible to standardize components required in fabricating the filter cloth.

Though the vertical length F(x) of filter cloth 11 may be varied according to requirements, its filtering area can be used without limitation at a predetermined fixed filtering velocity. At this velocity, the filter cloth can also freely conform to the requirements. This is because the purging velocity of purity air does not vary at a predetermined filtering velocity even when the vertical length F(x) increases and thus both sides 11d of filter cloth 11 becomes wider. This can prevent the increase of pressure loss, which will be explained later in detail.

A filter cloth straining rod 20 shown in FIG. 3 is provided on the top and bottom of the filter cloth, to thereby make it stay tensile even when the vertical length F(x) of the filter cloth is 10–20 m.

As shown in FIG. 2, the mixed current of air and dust sucked from the dust source by the blower passes through suction pipe 21, and enters settling chamber 22 through the top of housing 1 due to inertia and gravity.

Figure 4A:
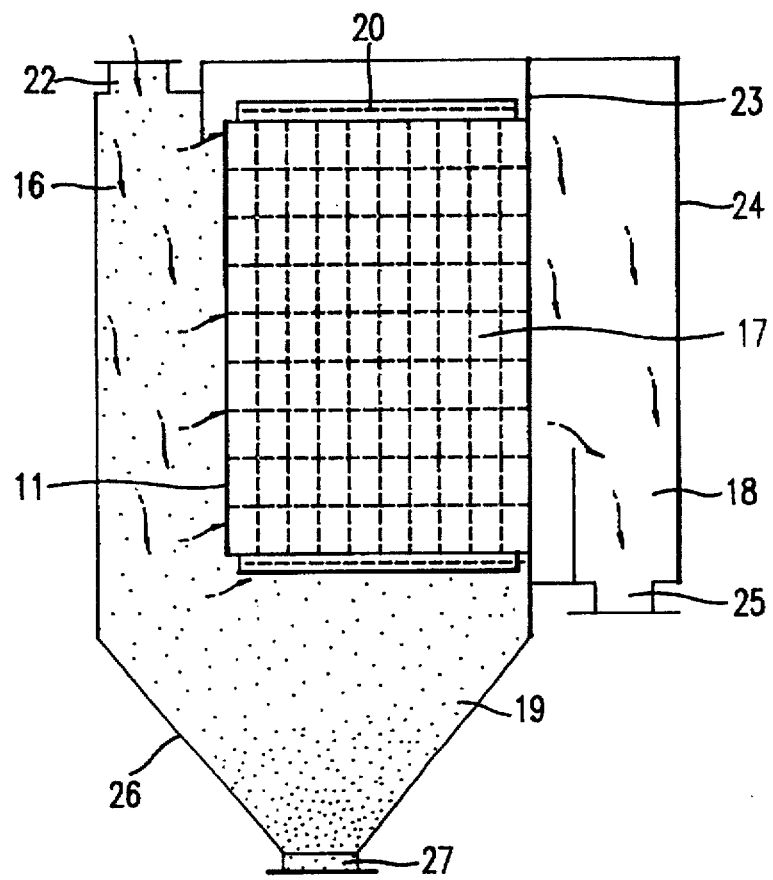
FIG. 4A is a schematic view of explaining the function of gas and solid.
Figure 4B:
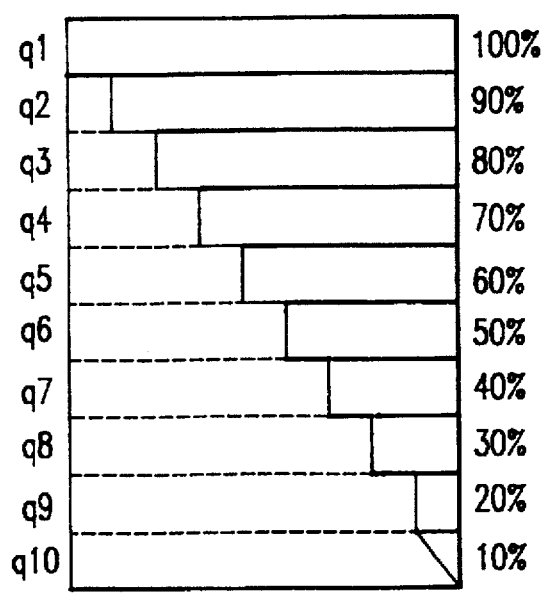
FIG. 4B is a table of explaining the falling ratio of the mixed current.
Figure 4C:
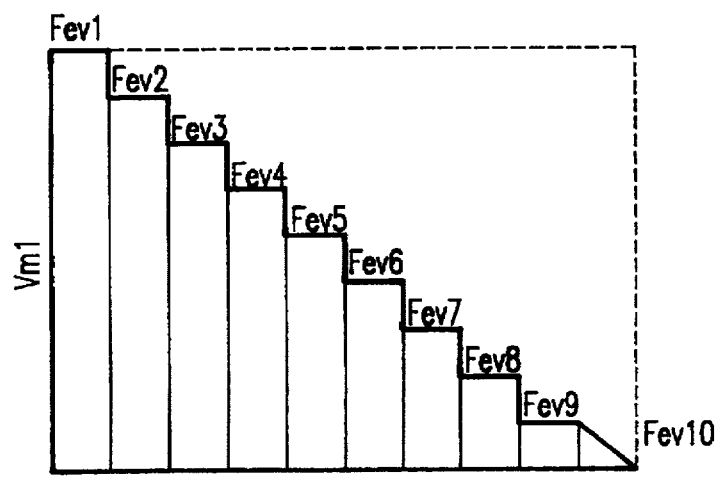
FIG. 4C illustrates the entry ratio of the mixed current.

The mixed current entering settling chamber 22 moves downward while reduced by 10% in flow amount at respective positions made by dividing its path into ten, that is, positions $q_1, q_2, q_3, q_4, q_5, q_6, q_7, q_8, q_9, q_{10}$ of FIG. 4B. It can be confirmed that the amount of flow is reduced by 10% by stages when checked at the respective positions. It is also noted that the mixed current maintains its inertia from $q_1$ to $q_{10}$ according to the differential law.

In other words, the mixed current retains sequential inertia when it falls. Of the mixed current, solid having a different specific gravity from that of air falls faster due to the sequential inertial and gravity. (refer to FIGS. 4A and 4B)

The fundamental cause of such a phenomenon is that purse-type filter cloth 11 is installed to be tensile by filter cloth straining rod 20 and push plate 13 to allow the mixed current to have an intermediate entry velocity Vmi when passing through both sides of the mixed current, and that at the same time, suction force is produced by the blower so that the air passing through purity air purging outlet 23 is exhausted through purging tube 24 and purging outlet 25. According to this operation, dust collected to discharge hopper 26 is exhausted through outlet 27.

Figure 2C:
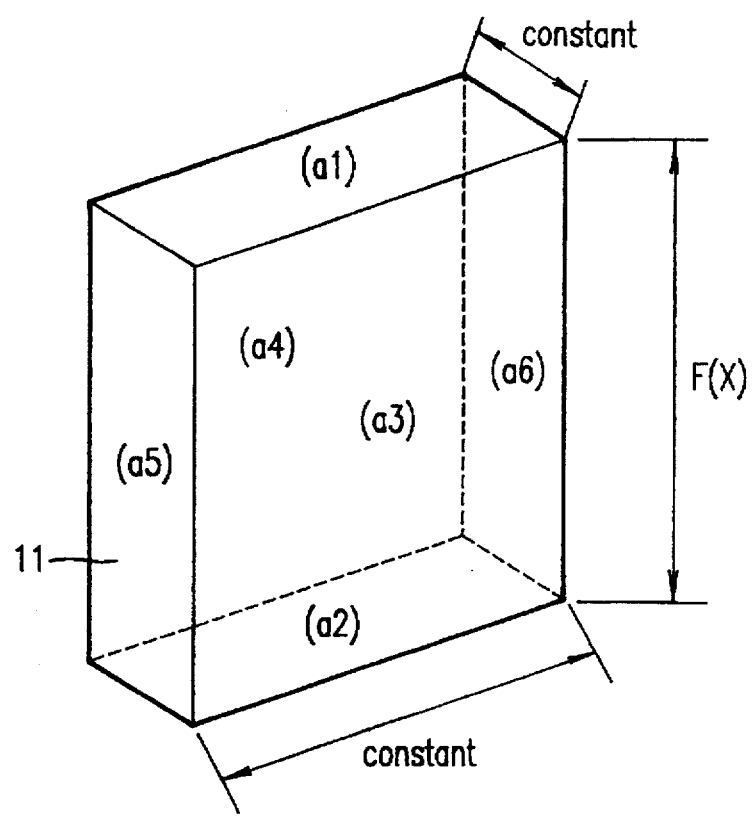
FIG. 2C is an elevational view of one purse-type filter cloth.

In filter cloth 11, when the purity air purging surface or $F(x)$ of FIG. 2C varies, $a_3$ and $a_4$ vary, and $a_6$ also varies at the same rate so that the purging velocity of purity air does not vary at a predetermined filtering velocity.

According to the flow of gas (synthetic gas) and solid (natural and chemical solids) examined by an experiment in FIG. 4A, the dust collector of purse-type filter cloth 11 is divided into dust settling area 16, filtering/dust collecting area 17, purity air purging area 18, dust purging area 19.

In dust settling area 16, the mixed current changes its direction in structure so that it falls faster in relation with the particle weight of the dust.

In dust settling area 16, while the mixed current falls to enter filtering/dust collecting area 17, it changes its direction by 90° toward the right filtering/dust collecting area 17 to maintain filtering position entry velocity Fev, as shown in FIG. 4A. While passing through filtering position entry velocity, the filtering velocity is changed secondarily.

Figure 4D:
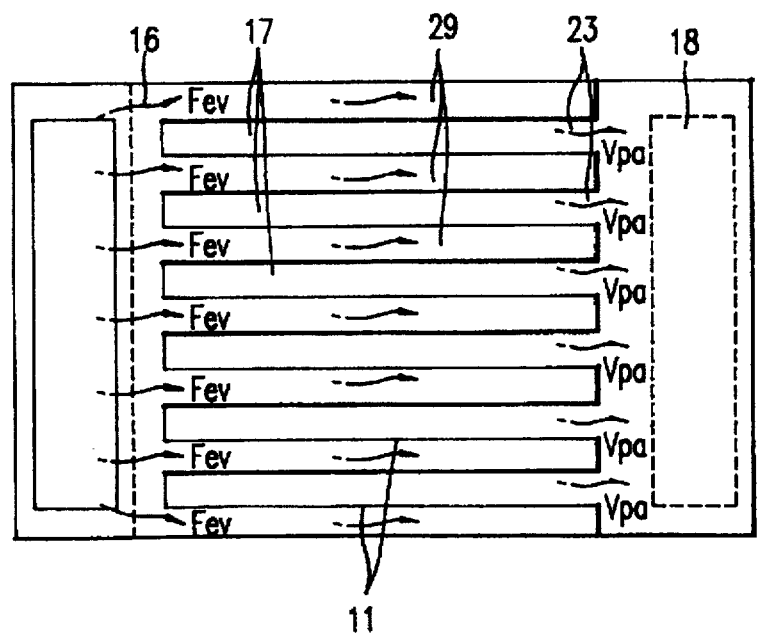
FIG. 4D illustrates the velocities of the mixed current at the respective areas and the positions thereof on planes.

Here, inertia is added to the dust, increasing downward sedimentation effect. As a result, 30–40% of the entered dust falls directly to dust purging area 19 from dust settling area 16 due to the inertia produced during the first direction change of the mixed current and natural gravity sedimentation force. As shown in FIG. 4D, in intermediate area 29 in which the intermediate entry velocity Vmi is changed to the filtering entry velocity Fev, the mixed current is exhausted through purity air purging area 18 after its velocity is changed to the filtering velocity.

Hereinafter, the phenomenon in which pressure loss is not produced inside the settling chamber even when the vertical length $F(x)$ of purse-type filter cloth 11 varies will be specifically explained in the following embodiment compared with the conventional bag-type filter cloth.

COMPARISON EXAMPLE

Provided that the diameter of bag-type filter cloth 7 is 0.11 m, its vertical length 5 m and its filtering velocity 1.2 m/sec, the purging velocity of purity air is obtained as follows.

The area of the purging outlet of purity air is $0.11^2 \times 0.785 = 0.0094985$ m. The filtering area of the filter cloth is $0.11 \times 3.14 \times 5 = 1.727$ m$^2$. Therefore, the amount of air processed becomes $1.727 \times 1.2 = 2.0724$ m$^2$/min. Accordingly, the purging velocity of purity air becomes $2.0724/0.0094985/60 \approx 3.636$ m/sec.

In this case, the length of the filter cloth is extended by 7 m in order to find another purging velocity of purity air.

The area of the purging outlet of purity air is $0.11^2 \times 0.785 = 0.0094985$ m. The filtering area of the filter cloth is $0.11 \times 3.14 \times 12 = 4.1448$ m$^2$. Therefore, the amount of air processed becomes $4.1448 \times 1.2 = 4.97376$ m$^2$/min. Accordingly, the purging velocity of purity air becomes $4.97376/0.0094985/60 \approx 8.7273$ m/sec.

In short, in the case that the vertical length of the filter cloth is elongated to 12 m from 5 m, the purging velocity of purity air becomes faster from 3.636 m/sec to 8.7273 m/sec, resulting in pressure loss inside the settling chamber.

Embodiment

Given that the dimensions of the purse-type filter cloth are determined as 1.8 m in width 5 m in length (vertical length:$F(x)$), and 1.2 m/sec in flitering velocity, the purging velocity of purity air is obtained as follows.

The filtering area of flow to be sucked is 1.8 (wide)×5 (long)×2 (filtering surface)=18 m$^2$ so that the amount of purity air processed becomes 18 (filtering area)×1.2 (filtering velocity)=21.6 m$^3$/min. The area of the purging outlet is 0.078 (wide)×5 (high)=0.39 m$^2$. Therefore, the purging velocity of purity air becomes $21.6/0.39/60 \approx 0.923$ m/sec.

In this case, the vertical length of the filter cloth is changed to 15 m to find another purging velocity of purity air.

The filtering area of the current to be sucked is 1.8 (wide) ×15 (long)×2 (filtering surface)=54 m$^2$ so that the amount of purity air processed becomes 54 (filtering area)× 1.2 (filtering velocity)=64.8 m$^3$/min. The area of the purging outlet is 0.078 (wide)×15 (high)=1.17 m$^2$. Therefore, the purging velocity of purity air becomes $64.8/1.17/60 \approx 0.923$ m/sec. It is here noted that this purging velocity of purity air is the same as the case in which the vertical length $F(X)$ of the filter cloth is 5 m.

As described above, in the present invention/the mixed current is sucked through the top of the settling chamber and purity air is exhausted through the bottom of the housing to collect dust contained in the mixed current. Therefore, in removing the dust of the filter cloth, this prevents the dust attached to the filter cloth from colliding with the mixed current and being thus rescattered. In addition, the purging velocity of purity air can be maintained constant independent of the vertical length of the purse-type filter cloth, preventing pressure loss inside the settling chamber. This elongates the duration of the filter cloth and does not apply overload to the blower. Accordingly, the blower's motor is not damaged.

What is claimed is:

1. A dust collector comprising:
   a housing having an intake on top of said housing for receiving a mixed current containing natural or chemically produced solid fine material;
   a hexahedral purse-shaped filter cloth having a plurality of vertically divided paths and being installed in a zigzag inside said housing to form a filtering/dust collecting area and for filtering the solid fine material and purging only purity air, wherein the mixed current moves downward along said housing while flow amount of the mixed current is reduced by a fixed percentage rate in a staircase manner and the mixed current flows through each path of said filter cloth separately.

a purging portion for exhausting purity air cleaned by said purse-shaped filter cloth through said housing.

2. A dust collector as claimed in claim 1, wherein retainers are stacked between a purse-shaped filter cloth, and a push plate is put on the mouth of said filter cloth and fastened by a fastening device so that said purse-shaped filter cloth is supported by said retainers.

3. A dust collector as claimed in claim 2, wherein a filter cloth straining rod is installed on the top and bottom of said purse-shaped filter cloth.

4. A dust collector as claimed in claim 1, wherein a purging outlet of said purging portion is placed lower than the bottom of said purse-shaped filter cloth installed in said housing.

* * * * *